UNITED STATES PATENT OFFICE.

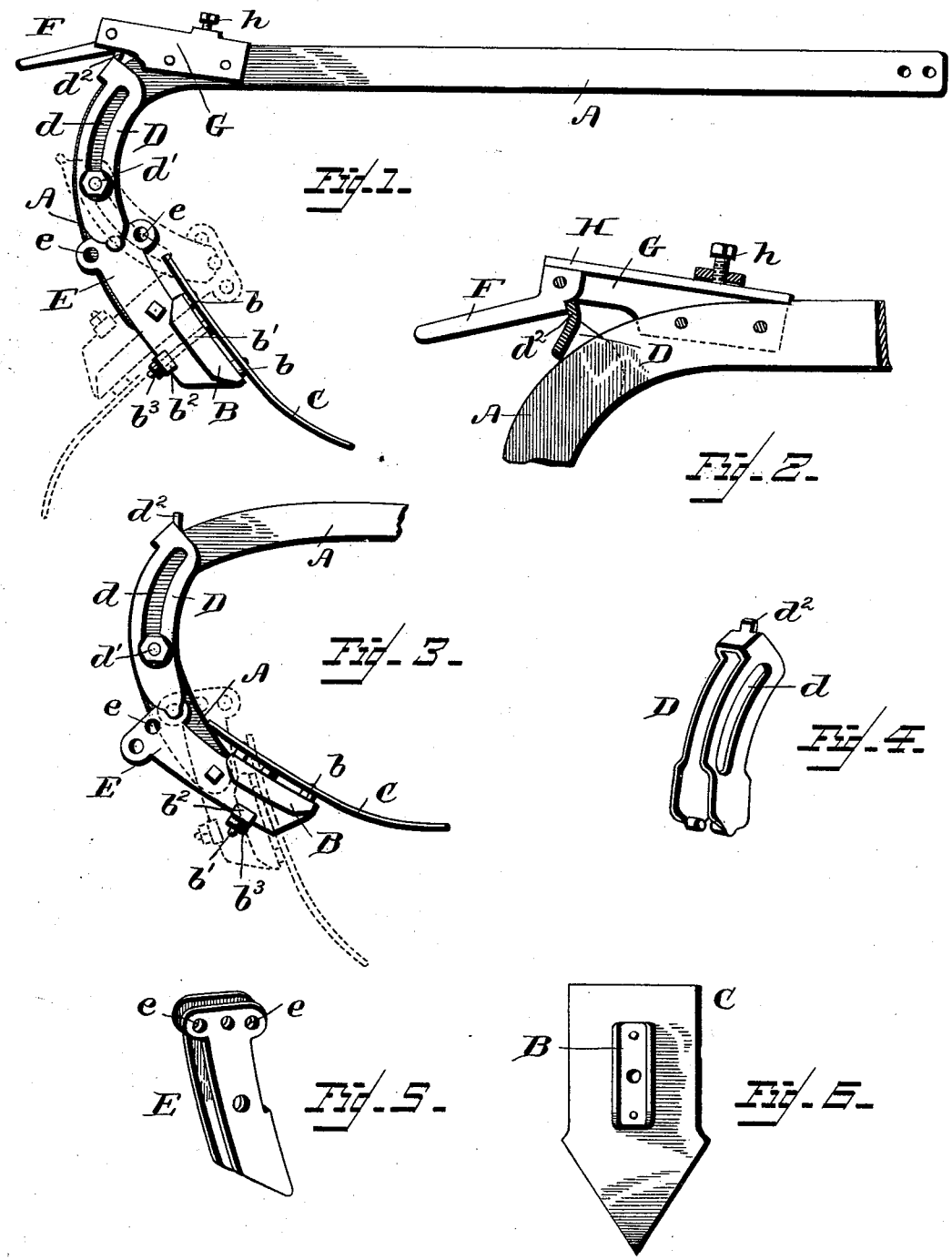

ALBERT HODGSON, OF MIDDLETOWN, KANSAS.

CULTIVATOR.

SPECIFICATION forming part of Letters Patent No. 508,712, dated November 14, 1893.

Application filed June 3, 1893. Serial No. 476,438. (No model.)

*To all whom it may concern:*

Be it known that I, ALBERT HODGSON, a citizen of the United States, residing at Middletown, in the county of Wilson, State of Kansas, have invented certain new and useful Improvements in Cultivators; and I do hereby declare the following to be a full, clear, and exact description of the invention, such as will enable others skilled in the art to which it appertains to make and use the same.

The object of the present invention is to improve that class of agricultural implements designed for cultivating and plowing the soil and which are adapted to yield when striking a root or other obstruction which would work injury to the implement if it did not yield.

A further object of the invention is to facilitate the adjustment of the plow or cultivating shovel to regulate the pitch of the same to cut shallow or deep as required without interfering with the devices for holding the said plow or shovel in working position under normal strain.

A still further object of the invention is the provision of means whereby the force for holding the plow or shovel in working position can be regulated at will and at a moment's notice so that the plow or shovel can be made to yield under a light pressure or the heavy strain as required.

The invention consists of the novel features and the peculiar construction and combination of the parts which will be hereinafter more fully described and claimed and which are shown in the annexed drawings, in which—

Figure 1 is a side elevation of a plow or cultivator embodying my invention, the full lines showing the working position of the parts, and the dotted lines showing the relative position of the parts after the plow or shovel has yielded to pass over an obstruction. Fig. 2 is a detail view of the latch for engaging with the upper end of the standard and for retaining the plow or shovel in working position, the spring operating on the latch, the mechanism for varying the tension of the said spring and the upper end of the standard, the parts being shown on a larger scale. Fig. 3 is a detail view showing the manner of varying the pitch of the plow or shovel. Fig. 4 is a detail view of the upper portion of the standard. Fig. 5 is a detail view of the lower portion of the standard. Fig. 6 is a detail view of the rear side of the plow or shovel showing the clip attached thereto and which is adapted to be fitted upon the lower end of the standard.

The beam A is of usual construction having its rear end bent down to form a support for the parts comprising the standard which carries the plow or cultivator shovel C. The plow or shovel C is of ordinary formation and is secured to the lower end of the standard. It is preferred to have a clip B secured to the rear side of the shovel so as to embrace the side of the standard and firmly brace and secure the shovel against unequal strain. This clip B is attached at its ends by rivets or bolts to the shovel and washers $b$ are interposed between the rear side of the shovel and the opposing side of the clip to provide a space between the rear side of the shovel and the opposing side of the clip between the said washers to receive the head of the fastening bolt $b'$ which secures the shovel to the standard. A plate $b^2$ is mounted upon the projecting end of the bolt $b'$ and is flanged at its end to embrace the side of the standard and receive the stress of the nut $b^3$ on the threaded end of the said bolt $b'$.

The standard is composed of two parts D and E which are pivotally connected together at their opposing ends to admit of the plow or shovel yielding when meeting with an obstruction. The lower part E is pivoted to the lower end of the beam A at a point about midway between its ends. The upper part D is provided with a slot $d$ which receives a headed fastening $d$ attached to the bent portion of the beam A and has its upper end provided with a lip or stop $d^2$ which is adapted to be engaged by the latch F. The opposing ends of the parts D and E are pivotally connected, preferably by having a projecting portion on one part adapted to enter an opening on the other part. To admit of the parts being relatively adjusted so that the pitch of the plow or shovel may be varied one of the parts is provided with a series of openings $e$ which extend at right angles to the length of the standard. It is immaterial which part is provided with the openings and which with the projections to engage with the said openings. In the present construction the series of openings $e$ are provided at the upper end of the part D and the lower end of the part E is provided with the projection which enters one of the series of openings $e$. Obviously, if the part D remains relatively fixed and the part E is adjusted or turned on its pivotal connection with the bent end of the beam A the pitch of the plow or shovel C will be changed. In order that the standard may obtain an equal bearing on opposite sides of the bent end of the beam A the parts D and E composing the same will be duplicated, one being disposed on each side of the said bent portion of the beam A, the similar portions of each part being preferably formed of a single piece of plate metal which is stamped and doubled upon itself as most clearly shown in Figs. 4 and 5.

The latch F is pivoted to an arm G secured to the beam A and is held either in an operative position or out of the way by a spring H which is secured at its inner end to the said beam, the outer end being constructed to press upon one or the other of the flat edges provided at the inner end of the latch F. A set screw $h$ is provided to regulate the tension of the spring H to vary the pressure with which the same presses upon the latch F thereby regulating the force which holds the plow or shovel in a working position. This set screw $h$ is mounted in a portion of the arm G, the latter comprising two similar parts between which the spring is located and connected by a cross piece which forms a support for the said set screw. The latch is provided with a shoulder which engages with the lip or stop $d^2$ and is extended to provide a handle by means of which the latch can be operated by hand to be thrown in or out of an operative position.

The parts being disposed as shown by the full lines in Fig. 1 the plow or shovel is held in a working position in the manner set forth. Should the plow or shovel meet with a root or other unyielding obstruction the strain will exceed the pressure of the spring on the latch and permit the latter to yield and release the standard so that the plow or shovel will ride over the obstruction, the parts assuming the position shown by the dotted lines in Fig. 1. After the obstruction has been passed the plow or shovel is turned in operative position and the implement is ready for work. To vary the pitch of the plow or shovel the headed fastening $d'$, which in the present instance is a bolt, is loosened and the lower ends of the parts E separated sufficiently far to disengage the projections thereof from the openings $e$, the parts D being turned to the required position after which the parts of the upper portion D are brought together to engage the projections thereof with the proper openings $e$ and are held in the required position by tightening the fastening $b'$. It will be understood that there must be sufficient play between the heads of the fastenings $b'$ and the sides of the members of the parts D to permit the latter to move freely under all conditions.

Having thus described my invention, what I claim, and desire to secure by Letters Patent, is—

1. In an agricultural implement, the combination with a support, of a standard composed of two parts which are pivotally connected at their inner or opposing ends, the lower part being pivotally connected with the support between its ends and carrying the plow or shovel, the upper part having a tilting and a longitudinal movement, and a fastening to secure the said upper part of the standard to the said support and forming a fulcrum for the said upper part to tilt and slide upon, and a yielding latch to engage with the said upper part and normally hold the plow or shovel in a working position, substantially as set forth.

2. In an agricultural implement the combination of a support, a standard composed of two parts which are pivotally connected together at their inner ends, the lower part carrying a shovel and adapted to yield under abnormal conditions, a latch to engage with the upper part to hold the said standard in a working position, a spring for engaging with the said latch, and a set screw for varying the tension of the said spring to vary the force required to throw the shovel from a working position, substantially as set forth.

3. In an agricultural implement the combination of a support, a standard carrying a shovel or plow and composed of two parts, an adjustable pivotal connection between the inner ends of the said parts to provide for a change in the pitch of the shovel, and a yielding latch to engage with the upper part of the standard and hold the shovel in a working position, substantially as set forth.

4. In an agricultural implement, the combination of a support, a standard composed of two parts, which are attached to the said support, one of the said parts having a series of openings $e$ the other having a projection to engage with one of the said openings of the series to vary the pitch of the shovel, and a yielding latch to engage with the upper part of the standard to hold the shovel in working position under normal conditions, substantially as described.

5. The combination of the beam having a support at its rear end, a standard composed of two parts, an adjustable pivotal connection between the inner ends of the said parts to vary the pitch of the plow, the lower part being pivoted to the said support between its ends, the upper part being slotted, a fastening provided on the said support, and passing through the said slot to form a fulcrum for the said upper part to tilt and slide upon, a latch to engage with the said upper part, a spring to act upon the said latch, and a set screw to vary the tension of the said spring, substantially as and for the purpose set forth.

In testimony whereof I affix my signature in presence of two witnesses.

ALBERT HODGSON.

Witnesses:
W. P. TAYLOR,
JAMES B. FRY.